US012785773B2

(12) United States Patent
Zhang et al.

(10) Patent No.: US 12,785,773 B2
(45) Date of Patent: Nov. 3, 2026

(54) CHANNEL STATE INFORMATION REPORTING TECHNIQUES

(71) Applicant: ZTE Corporation, Shenzhen (CN)

(72) Inventors: Shujuan Zhang, Shenzhen (CN); Bo Gao, Shenzhen (CN); Minqiang Zou, Shenzhen (CN); Ling Yang, Shenzhen (CN); Xiaolong Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 291 days.

(21) Appl. No.: 18/614,097

(22) Filed: Mar. 22, 2024

(65) Prior Publication Data

US 2024/0235643 A1 Jul. 11, 2024

Related U.S. Application Data

(63) Continuation of application No. PCT/CN2022/123459, filed on Sep. 30, 2022.

(51) Int. Cl.
*H04B 7/06* (2006.01)
*H04B 17/336* (2015.01)

(52) U.S. Cl.
CPC ......... *H04B 7/0626* (2013.01); *H04B 7/0632* (2013.01); *H04B 7/0639* (2013.01); *H04B 17/336* (2015.01)

(58) Field of Classification Search
CPC .. H04B 7/0626; H04B 7/0632; H04B 7/0639; H04B 17/336
See application file for complete search history.

(56) References Cited

U.S. PATENT DOCUMENTS

| | | | | |
|---|---|---|---|---|
| 9,749,111 | B2 | 8/2017 | Hammarwall | |
| 2014/0010126 | A1* | 1/2014 | Sayana | H04J 3/1694 370/336 |

(Continued)

FOREIGN PATENT DOCUMENTS

| | | | | |
|---|---|---|---|---|
| CN | 110771197 | A | 2/2020 | |
| CN | 115004812 | A | 9/2022 | |
| TW | 202145746 | A * | 12/2021 | H04W 72/54 |
| WO | 2022024041 | A1 | 2/2022 | |

OTHER PUBLICATIONS

International Search Report and Written Opinion for International Application No. PCT/CN2022/123459, mailed on Mar. 17, 2023, 8 pages.

(Continued)

*Primary Examiner* — Kenny S Lin

(74) *Attorney, Agent, or Firm* — ASHURST PERKINS COIE US LLP

(57) ABSTRACT

Techniques and methods are described for channel state information reporting. In one aspect, a wireless communication method, comprising determining, by a wireless communication device, at least N time domain transmission occasions of measurement element at least one of channel state information reference signal (CSI-RS) or channel state interference measurement (CSI-IM), wherein N is an integer larger than 1; determining, by the wireless communication device, first channel state information CSI of one CSI reporting based on the at least N time domain transmission occasions of at least one of CSI-RS or CSI-IM; and transmitting, by the wireless communication device, the first channel state information.

20 Claims, 12 Drawing Sheets

(56) References Cited

U.S. PATENT DOCUMENTS

| | | | | |
|---|---|---|---|---|
| 2020/0107319 | A1 | 4/2020 | Bagheri et al. | |
| 2021/0266769 | A1* | 8/2021 | Chung | H04L 5/001 |
| 2022/0095268 | A1 | 3/2022 | Oh et al. | |
| 2022/0256458 | A1* | 8/2022 | Noh | H04B 7/06 |
| 2022/0369323 | A1* | 11/2022 | Hsieh | H04L 5/0057 |
| 2023/0067569 | A1 | 3/2023 | Manolakos et al. | |
| 2023/0275637 | A1 | 8/2023 | Kim et al. | |
| 2025/0343582 | A1* | 11/2025 | Dai | H04L 5/0078 |
| 2025/0392362 | A1* | 12/2025 | Gao | H04B 7/048 |

OTHER PUBLICATIONS

Huawei et al. (Moderator), "TP of Rel-17 CSI Enhancement for TS 38.214," 3GPP TSG RAN WG1 Meeting #108-e, R1-2202648, e-Meeting, Feb. 21-Mar. 3, 2022 (5 pages).

Zte, "Remaining issues on CSI enhancements for multi-TRP and FR1 FDD reciprocity," 3GPP TSG RAN WG1 #108-e, R1-2201191, e-Meeting, Feb. 21-Mar. 3, 2022 (4 pages).

Spreadtrum Communications, "Discussion on CSI enhancement for high/medium UE velocities and coherent JT," 3GPP TSG RAN WG1 #110, R1-2205983, Toulouse, France, Aug. 22-26, 2022 (10 pages).

Qualcomm Inc., "CSI enhancements for high/medium UE velocities and Coherent-JT," 3GPP TSG RAN WG1 #109-e, R1-2207217, Toulouse, France, Aug. 22-26, 2022 (23 pages).

Huawei et al. (Moderator), "Summary of CSI enhancements for MTRP and FDD (Round 0)," 3GPP TSG RAN WG1 Meeting #108-e, R1-2202645, e-Meeting, Feb. 21-Mar. 3, 2022 (25 pages).

EPO, Extended European Search Report for European Application No. 22 958 325.7, mailed on Oct. 8, 2024, 12 pages.

* cited by examiner

CHANNEL STATE INFORMATION REPORTING TECHNIQUES

CROSS REFERENCE TO RELATED APPLICATIONS

This patent document is a continuation of and claims benefit of priority to International Patent Application No. PCT/CN2022/123459, filed on Sep. 30, 2022. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

A wireless communication method, comprising determining, by a wireless communication device, at least N time domain transmission occasions of measurement element at least one of channel state information reference signal (CSI-RS) or channel state interference measurement (CSI-IM), wherein N is an integer larger than 1, determining, by the wireless communication device, first channel state information CSI of one CSI reporting based on the at least N time domain transmission occasions of at least one of CSI-RS or CSI-IM, transmitting, by the wireless communication device, the first channel state information.

A wireless communication method, receiving by a wireless communication node, first channel state information from a wireless communication device, wherein the first channel state information is determined by determining, by the wireless communication device, at least N time domain transmission occasions of channel state information reference signal (CSI-RS) or channel state interference measurement (CSI-IM), wherein N is an integer larger than 1; determining, by the wireless communication device, first channel state information CSI of one CSI reporting based on the at least N time domain transmission occasions of CSI-RS or CSI-IM.

In some embodiments, the at least N time domain transmission occasions correspond to at least one or multiple CSI-RS resources, or one or multiple CSI-IM resources.

In some embodiments, the methods described above further comprising at least one of: dropping and/or stopping transmitting, by the wireless communication device, the one CSI reporting when a condition is satisfied; dropping and/or stopping receiving, by the wireless communication node, the one CSI reporting when the condition is satisfied; stop transmitting, by the wireless communication device, the first CSI if the condition is satisfied; stop receiving, by the wireless communication node, the first CSI if the condition is satisfied; determining and transmitting, by the wireless communication device, a second CSI when the condition is satisfied; or receiving, by the wireless communication node, a second CSI when the condition is satisfied.

In some embodiments, the CSI reporting comprising at least one of: the first CSI corresponding to a second type of reference time unit; the second CSI corresponding to a first type of reference time unit; or the first CSI and the second CSI corresponds to different sets of reference time units.

In some embodiments, the second type of reference time unit includes one or more time units which is not before a time unit where the first communication device transmits the first CSI or the second CSI.

In some embodiments, the first type of reference time unit includes one or more time units which is before a time unit where the first communication device transmits the first CSI or the second CSI.

In some embodiments, the method further comprising at least one of: the second type of reference time unit includes one or more time units and the first type of reference time unit includes one time unit; the first type of reference time units includes a subset of the second type of reference time unit.

In some embodiments, the condition comprises at least one of: receiving, by the wireless communication device, D time domain transmission occasions of the CSI-RS or CSI-IM no later than a reference time unit after an event; receiving, by the wireless communication device, D time domain transmission occasions of the CSI-RS or CSI-IM no later than a reference time unit in a (Discontinuous Reception) DRX Active Time; receiving, by the wireless communication device, D time domain transmission occasions of the CSI-RS or CSI-IM no later than a reference time unit in an active duration of a configured parameter; transmitting, by the wireless communication node, D time domain transmission occasions of the CSI-RS or CSI-IM no later than a reference time unit after an event; transmitting, by the wireless communication node, D time domain transmission occasions of the CSI-RS or CSI-IM no later than a reference time unit in a (Discontinuous Reception) DRX Active Time; or transmitting, by the wireless communication node, D time domain transmission occasions of the CSI-RS or CSI-IM no later than a reference time unit in an active duration of a configured parameter, wherein D is less than N and is larger or equals to 1.

In some embodiments, the condition comprises at least one of receiving, by the wireless device, no time domain transmission occasions of the CSI-RS or CSI-IM no later than a reference time unit after an event; receiving by the wireless device, no time domain transmission occasions of the CSI-RS or CSI-IM no later than the reference time unit in a (Discontinuous Reception) DRX Active Time; receiving by the wireless device, no time domain transmission occasions of the CSI-RS or CSI-IM no later than a reference time unit in an active duration of a configured parameter; transmitting, by the wireless node, no time domain transmission occasions of the CSI-RS or CSI-IM no later than a reference time unit after an event; transmitting, by the wireless node, no time domain transmission occasions of the CSI-RS or CSI-IM no later than the reference time unit in a (Discontinuous Reception) DRX Active Time; or transmitting, by the wireless node, no time domain transmission occasions of the CSI-RS or CSI-IM no later than a reference time unit in an active duration of a configured parameter.

In some embodiments, the event is at least one of following: 1) CSI report configuration, 2) CSI report reconfiguration, 3) serving cell activation, 4) BWP change, or 5) activation of SP-CSI.

In some embodiments, the at least N time domain transmission occasions of the CSI-RS are for channel measurement or for interference measurement.

In some embodiments, the condition comprises at least one of: receiving, by the wireless communication device, only D time domain transmission occasions of the CSI-RS or CSI-IM no later than a reference time unit after an event; receiving, by the wireless communication device, only D time domain transmission occasions of the CSI-RS or CSI-IM no later than a reference time unit in a (Discontinuous Reception) DRX Active Time; receiving, by the wireless communication device, only D time domain transmission occasions of the CSI-RS or CSI-IM no later than a reference time unit in an active duration of a configured parameter, transmitting, by the wireless communication node, only D time domain transmission occasions of the CSI-RS or CSI-IM no later than a reference time unit after an event; transmitting, by the wireless communication node, only D time domain transmission occasions of the CSI-RS or CSI-IM no later than a reference time unit in a (Discontinuous Reception) DRX Active Time; or transmitting, by the wireless communication node, only D time domain transmission occasions of the CSI-RS or CSI-IM no later than a reference time unit in an active duration of a configured parameter, wherein D is less than N and is larger or equals to 1.

In some embodiments, the condition comprises at least one of: receiving, by the wireless communication device, D time domain transmission occasions of the CSI-RS for channel measurement no later than a reference time unit after an event; receiving, by the wireless communication device, E time domain occasions of CSI-RS and/or CSI-IM for interference measurement no later than the reference time unit after an event; receiving, by the wireless communication device, D time domain transmission occasions of the CSI-RS for channel measurement no later than a reference time unit in a (Discontinuous Reception) DRX Active Time; receiving, by the wireless communication device, E time domain occasions of CSI-RS and/or CSI-IM for interference measurement no later than the reference time unit in the DRX Active Time; receiving, by the wireless communication device, D time domain transmission occasions of the CSI-RS for channel measurement no later than a reference time unit in an active duration of a configured parameter; receiving, by the wireless communication device, E time domain occasions of CSI-RS and/or CSI-IM for interference measurement no later than the reference time unit in an active duration of a configured parameter; wherein D is less than N, E is less than L, wherein L is an integer larger than 0.

In some embodiments, the above methods further comprises: determining, by the wireless communication device, the at least N time domain transmission for channel measurement and at least L time domain occasion of CSI-RS or CSI-IM for interference measurement; determining, by the wireless communication device, the first CSI based on the at least N time domain transmission for channel measurement and at least L time domain occasion of CSI-RS or CSI-IM for interference measurement; transmitting, by the wireless communication device, the first CSI, wherein L larger or equals to 1, and/or L is N or smaller than N.

In some embodiments, the event is at least one of following: 1) CSI report configuration, 2) CSI report reconfiguration, 3) serving cell activation, 4) BWP change, or 5) activation of SP-CSI.

In some embodiments, the first CSI is determined based on a state of time restriction for channel measurement, further comprising at least one of: when the state of the time restriction is "notConfigured", the first CSI is determined based on the at least N time domain transmission occasions of the CSI-RS for channel measurement no later than a reference time unit; when the state of the time restriction is "Configured", the CSI is determined based on most recent, no later a reference time unit, only N time domain transmission occasions of the CSI-RS for channel measurement.

In some embodiments, the at least N transmission occasions includes at least two of following transmission occasions: 1) periodic transmission occasion, 2) semi-persistent transmission occasions, and/or 3) aperiodic transmission occasions.

In some embodiments, the one reporting is associated with more than one type of CSI-RS resources for channel measurement, wherein the type of CSI-RS resources comprises at least one following type of resources: 1) periodic, 2) semi-persistent, and/or 3) aperiodic.

In some embodiments, the first CSI includes CSI corresponding to F reference time units, wherein F is an integer larger than 1 or equal to be.

In some embodiments, further comprising at least one of: the state of a time restriction for channel measurement and/or interference measurement depends on F; or the state of a time restriction for channel measurement and/or interference measurement depends on a type of the F reference time units.

In some embodiments, the state of a time restriction satisfying at least one of: the time restriction for channel measurement and/or interference measurement is not configured when the F reference time units includes a second type of time unit or when F is larger than 1; or the time restriction for channel measurement and/or interference measurement is configured or not configured when F is smaller than 2, or when the F reference time units includes a first type of time unit.

In some embodiments, the F reference time units satisfying at least one of: the first time unit of the F reference time units is a reporting slot including the first CSI; a gap between the first time unit of the F reference time units and the reporting slot including the first CSI is determined by received signaling; the gap between the first time unit of the F reference time units and the reporting slot including the first CSI is determined by a parameter of the CSI-RS or CSI-IM; the F reference time units are not before the reporting slot including the first CSI; the F reference time units includes time units after a reporting slot including the first CSI.

In some embodiments, F is determined by at least value of N; a capacity reporting reported by the wireless communication device; or a received signaling from the wireless communication node.

In some embodiments, the F reference time units are continuous or non-continuous.

In some embodiments, the condition includes at least one of: none of the F reference time units are available downlink time unit; or at least one of the F reference time units is not an available downlink time unit.

In some embodiments, the first CSI includes PMI and CQI, wherein the first CSI satisfying at least one of: the first CSI includes PMI for each time units in a first time unit set; the first CSI includes CQI for each time units in a second time unit set; the first CSI includes PMI and CQI, each PMI and CQI corresponds to different type of time units of the F reference time units, wherein the first time unit set and the second time unit set includes time units of the F reference time units.

In some embodiments, N satisfies at least one of: N is larger or equals to 5; N is one of 5, 10, 15, or 20; N is included in a capacity reporting reported by the wireless communication device to a wireless communication node; or N is determined by a received signaling.

In some embodiments, L satisfies at least one of: L is larger or equals to 5; L is one of 5, 10, 15, or 20; L is included in a capacity reporting reported by the wireless communication device to a wireless communication node; or L is determined by a received signaling.

In some embodiments, the at least N time domain transmission occasions are no later than a reference time unit.

In some embodiments, the at least L time domain occasions of interference measurement are no later than a reference time unit.

In some embodiments, the first CSI is determined based on a state of time restriction for interference measurement, further comprising at least one of: when the state of the time restriction for interference measurement is "notConfigured", the first CSI is determined based on the at least L time domain occasions of the CSI-RS and/or CSI-IM for interference measurement; when the state of the time restriction for interference measurement is "Configured", the CSI is determined only based on a most recent, no later a reference time unit, L time domain occasions of CSI-RS and/or CSI-IM for interference measurement.

In some embodiments, the first CSI is based on an assumption of a parameter, wherein the F reference time units have same or different the assumption of the parameter and/or the determined CSI includes at least one of PMI, CQI, or Time domain channel property.

A wireless communication method, comprising: determining X reference time units, by a wireless communication device for one channel state information (CSI) reporting, wherein X is an integer larger or equals to 1; determining, by the wireless communication device, a first channel state information (CSI) corresponding to one or more time units of the X reference time units; reporting, by the wireless communication device, the first CSI to a wireless communication node.

A wireless communication method, comprising, receiving, by a wireless communication node, a first channel state information (CSI) from a wireless communication device, wherein the CSI is determined by determining X reference time units, by a wireless communication device for one CSI reporting, wherein X is an integer larger or equals to 1; and determining, by the wireless communication device, the first CSI corresponding to one or more time units of the X reference time units.

In some embodiments, the X reference time units comprises more than one types of time unit.

In some embodiments, the X reference time units comprises a first type time unit and a second type of time unit, wherein at least one of the one reporting: time domain transmission occasions of channel measurement and time domain occasion of interference measurement is no later than the first type of time unit, wherein the second type of time unit includes the one or more time units of the X reference time units corresponding to the first CSI.

In some embodiments, a time restriction for channel measurement or for interference measurement is not configured when X is larger than 1 and/or when the X reference time units includes a time unit after a reporting slot including the first CSI.

In some embodiments, the X reference time units satisfying at least one of: a first time unit of the X reference time units is a reporting slot including a first CSI; a gap between the first time unit of the X reference time units and the reporting slot including the first CSI is determined by received signaling; a gap between the first time unit of the X reference time units and the reporting slot including the first CSI is determined by a parameter of a CSI-RS or CSI-IM; the X reference time units are not before the reporting slot including the CSI; wherein X is included in a capacity reporting by the wireless communication device.

In some embodiments, the X time units are continuous or non-continuous.

In some embodiments, the first CSI satisfying at least one of: the first CSI includes PMI for each time units in a first time unit set; the first CSI includes CQI for each time units in a second time unit set; wherein the first time unit set and the second time unit set includes time units of the X time units.

In some embodiments, the above methods comprising at least one of dropping, by the wireless communication device, the first CSI if a condition is satisfied; or stopping receiving, by the wireless communication node, the first CSI if the condition is satisfied;

determining and reporting, by the wireless communication node, second CSI if the condition is satisfied; or receiving, by the wireless communication node, the second CSI if the condition is satisfied.

In some embodiments, the condition comprising: determining, by the wireless communication node or the wireless communication device, no valid time domain resource available for a first type of the reference time unit which is included in the X reference time units.

In some embodiments, the condition comprising: determining, by the wireless communication node or the wireless communication device, all second type of reference time units in the X reference time unit is not a valid downlink time unit; or determining, by the wireless communication node or the wireless communication device, at least one of a second type of reference time unit in the X reference time units is not a valid downlink time unit.

In some embodiments, the first CSI includes CSI only corresponding to a first type of reference time unit when 1) the wireless communication device identifies less than N transmission occasions for channel measurement and/or less than L transmission occasions for interference measurement no later than the first type of reference unit, or 2) X is 1.

In some embodiments, the first CSI includes CSI for each of a first type of reference time units and a second type of reference time units when 1) the wireless communication device identifies at least N transmission occasions for channel measurement and/or at least L transmission occasions for interference measurement no later than the first type reference time unit.

In some embodiments, the CSI reporting does not contain a precoding matrix and/or CQI for a second type of reference time unit included in the X reference time unit when 1) the wireless communication device identifies less than N transmission occasions for channel measurement and less than L transmission occasions for interference measurement no later than a first type of reference time unit.

In some embodiments, the first CSI includes a time unit index corresponding to largest CQI value among multiple CQI values each of which corresponds to one of the X time unit.

In some embodiments, the above methods further comprises determining, by the wireless communication device a gap base on at least one of following: 1) X; 2) whether the CSI includes CSI corresponding to a second type of reference time units; or 3) a parameter of the reference X time units.

In some embodiments, the gap includes at least one of: a gap between a first type of reference time unit and a slot wherein the wireless communication device reports the CSI reporting; a gap between a DCI triggering the first CSI and a slot wherein the wireless communication device reports the first CSI; a gap between a last OFDM symbol of measurement reference signal or measurement resource of the one reporting and a slot wherein the wireless communication device reports the first CSI.

In some embodiments, the X is determined by at least one of X is included in a capacity reporting reported by the wireless communication device to the wireless communication node; X is determined by a received signaling; X is included in the CSI reporting; or X is determined by a parameter of measurement reference signal of the one reporting.

In some embodiments, the first CSI includes at least one of PMI, CQI, or Time domain channel property.

In yet another exemplary embodiment, a device that is configured or operable to perform the above-described methods is disclosed.

The above and other aspects and their implementations are described in greater detail in the drawings, the descriptions, and the claims.

Through above method and system, the UE can predict CSI for some reference time units and trace well the fast changed channel. The overhead of reporting CSI is reduced. The method of reporting CSI in the case where less than N/L or no time domain occasions no later than a first reference time unit is received by the UE, is provided. Then the UE and gNB can well know the CSI in this case without additional signaling. The gNB can know at least a second CSI in this case, then the gNB can well schedule the UE in this case.

DETAILED DESCRIPTION

Embodiment 1

The UE determines N time domain channel state information-Reference signal (CSI-RS) transmission occasions and determines a channel state indication (CSI) of one CSI reporting based on the N time domain CSI-RS transmission occasions.

The N is larger than one.

The N time domain CSI-RS transmission occasions can correspond to one or multiple CSI-RS resources.

For example, the N time domain CSI-RS transmission occasions corresponds to N time domain transmission occasions of one periodic CSI-RS resource/semi-persistent CSI-RS resource. That is the N time domain CSI-RS transmission occasions corresponds to N time domain transmission periods of one periodic CSI-RS resource/semi-persistent CSI-RS resource.

Alternatively, the N time domain CSI-RS transmission occasions corresponds to M CSI-RS resources. M is equal to or smaller than N. If N is equal to M, each of the N time domain CSI-RS transmission occasions corresponds to one CSI-RS resource.

In some implementation, the N CSI-RS resources is aperiodic CSI-RS.

Figure 1:
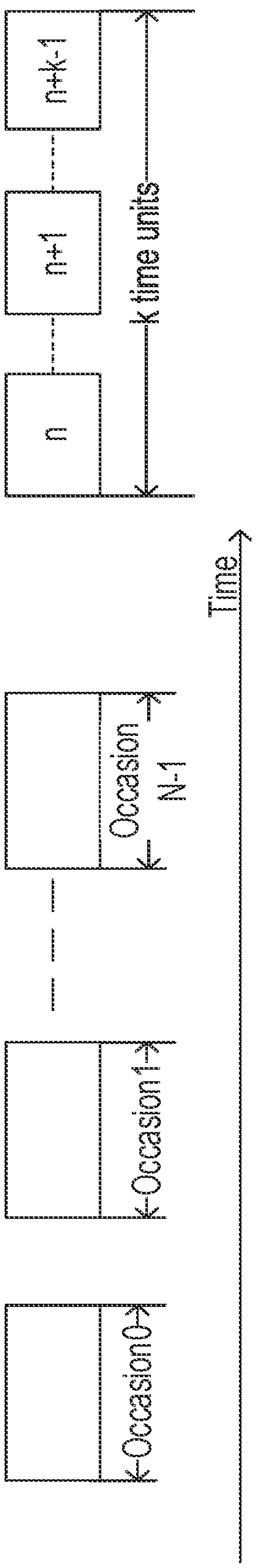
FIG. 1 provides an exemplary diagram of adopting N transmission occasions to predict the CSI on the k following units.

As shown in FIG. 1, a UE determines the N time domain CSI-RS transmission occasions and predicts channel state information (CSI) on the following k time units based on the N time domain CSI-RS transmission occasions.

In some implementation, the UE reports its capability of N and the N is determined by the reported value by the UE. Because the N depends on the prediction algorithm of the UE.

In some implementation, the N is a fixed values agreed by the UE and gNB.

In some implementation, the N is configured by the gNB using signaling.

The k time units can be continuous or non-continuous.

In some implementation, the N is equal to or larger than 5. For example, the N can be one of 5, 8, 10, 20, 30, or 87.

In some implementation, the N is equal to or larger than 10. For example, the N can be one of 10, 15, 20, 25, 30, or 87.

Figure 2:
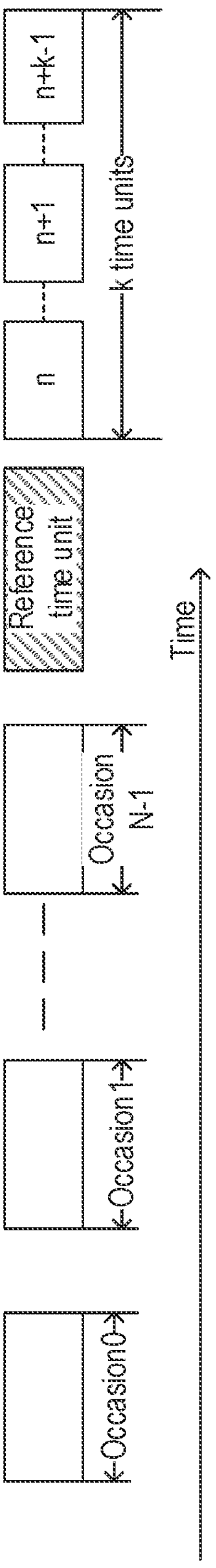
FIG. 2 provides an exemplary diagram of adopting N transmission occasions no later than one reference time unit to predict the CSI on the k following units.
Figure 3:
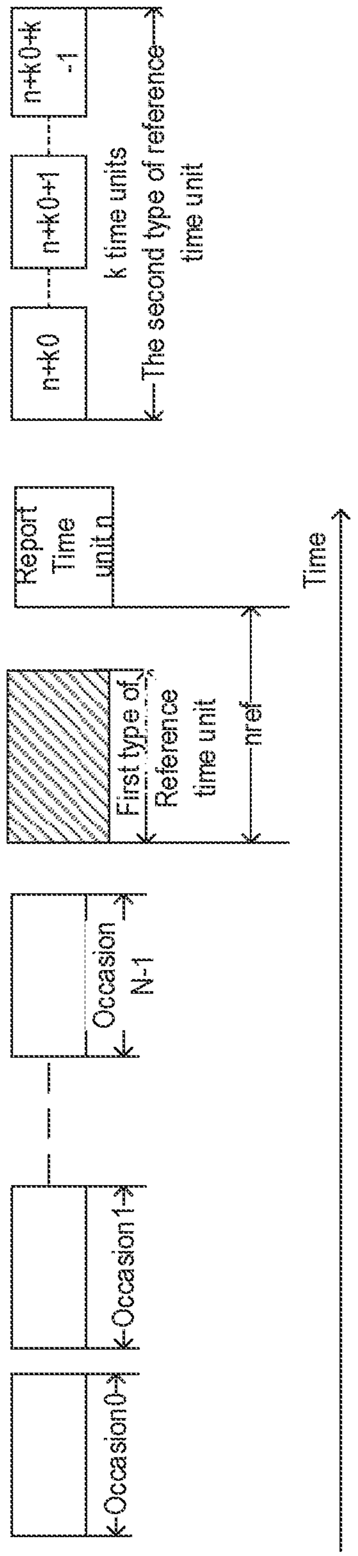
FIG. 3 provides an exemplary diagram of the two types of reference time units.

In some implementation, the N time domain CSI-RS transmission occasions is no later than one reference time unit as shown in FIG. 2. The reference time unit can be one slot. In some implementation, the one reference unit can be named as CSI reference resource. The time gap between the PUSCH/PUCCH including the CSI reporting is determined by $n_{ref}$ as shown in FIG. 3.

In some implementation, the UE determines at least N time domain CSI-RS transmission occasions and determines CSI of one CSI reporting based on the at least N time domain CSI-RS transmission occasions.

If the UE cannot determine/find the at least N time domain CSI-RS transmission occasions, the UE will drop the CSI reporting and does not report the CSI.

In some implementation, after an event happens (or in a time duration), the UE only reports the CSI after receiving at least the N time domain CSI-RS transmission occasions no later than reference time unit and the UE drops the CSI otherwise.

For example, the event includes at least one of the CSI report (re)configuration, serving cell activation, BWP change, or activation of semi-persistent-CSI (SP-CSI).

If the N time domain CSI-RS transmission occasions corresponds to N CSI-RS resources, it means that the UE only reports the CSI after receiving at least one time domain CSI-RS transmission occasion of each of the N CSI-RS resource no later than the reference time unit and the UE drops the CSI otherwise.

In some implementation, when Discontinuous Reception (DRX) is configured, the UE reports a CSI report only if receiving at least the N time domain CSI-RS transmission occasions in DRX Active Time no later than reference time unit and drops the report otherwise.

If the N time domain CSI-RS transmission occasions corresponds to N CSI-RS resources, it means that the UE reports a CSI report only if receiving at least one time domain CSI-RS transmission occasion of each of the N CSI-RS resource in DRX Active Time no later than reference time unit and drops the report otherwise.

In some implementation, the CSI of the one CSI reporting is reported in one reporting instance (and/or in one PUSCH/PUCCH). Alternatively, the CSI of the one CSI reporting is reported in more than one reporting instance.

In some implementation, the N time domain CSI-RS transmission occasions is for channel measurement.

In some implementation, the N time domain CSI-RS transmission occasions is for interference measurement.

In some implementation, the N time domain CSI-RS transmission occasions is for channel measurement and for interference measurement.

For example, the UE determines N time domain CSI-RS transmission occasions for channel measurement and L time domain CSI-RS transmission occasions for interference measurement, the UE determines channel state indication (CSI) of one CSI reporting based on N time domain CSI-RS transmission occasions for channel measurement and the L time domain CCSI-RS transmission occasions for interference measurement. The L can be equal to or smaller than N. In some implementation, the L is larger than 1 or equal to 1. In some implementation, the L can be larger than N.

In some implementation, for calculating precoding matrix indication (PMI), it needs the N time domain CSI-RS transmission occasions for channel measurement and for calculating (channel quality indicator) CQI, it needs the N time domain CSI-RS transmission occasions for channel measurement and the L time domain CSI-RS transmission occasions for interference measurement. Calculating PMI and channel CQI depends on different time domain occasions.

In some implementation, for calculating PMI and CQI, it needs the N time domain CSI-RS transmission occasions for channel measurement and the L time domain CSI-RS transmission occasions for interference measurement.

In some implementation, if the higher layer parameter timeRestrictionForInterferenceMeasurements is set to "notConfigured", the UE shall derive the interference measurements for computing CSI value reported in uplink slot n based on only the CSI-IM and/or NZP CSI-RS for interference measurement no later than the CSI reference time unit associated with the CSI resource setting of the one CSI reporting. That is the number of time occasion of CSI-IM and/or NZP-CSI-RS to get the CSI is not restricted/limited.

In some implementation, if the higher layer parameter timeRestrictionForInterferenceMeasurements in CSI-ReportConfig is set to "Configured", the UE shall derive the interference measurements for computing the CSI value reported in uplink slot n based on the most recent, no later than the CSI reference time unit, L occasions of CSI-IM and/or NZP CSI-RS for interference measurement associated with the CSI resource setting of the CSI reporting. That is the number of time occasion of CSI-IM and/or NZP-CSI-RS to get the CSI is restricted/limited.

If the higher layer parameter timeRestrictionForChannelMeasurements is set to "notConfigured", the UE shall derive the channel measurements for computing CSI value reported in uplink slot n based on only the NZP CSI-RS for channel measurement, no later than the CSI reference time unit, associated with the CSI resource setting. That is the number of time occasion of NZP CSI-RS for channel measurement to get the CSI is not restricted/limited.

If the higher layer parameter timeRestrictionForChannelMeasurements in CSI-ReportConfig is set to "Configured", the UE shall derive the channel measurements for computing CSI reported in uplink slot n based on only the most recent, no later than the CSI reference resource, N occasions of NZP CSI-RS associated with the CSI resource setting of the CSI reporting. That is the number of time occasion of NZP CSI-RS for channel measurement to get the CSI is restricted/limited.

The N time domain CSI-RS transmission occasions include more than one type CSI-RS transmission occasions. The more than one type CSI-RS transmission occasions include at least two of a periodic, semi-persistent and aperiodic CSI transmission occasion.

For example, the N time domain CSI-RS transmission occasions includes Y periodic/semi-persistent CSI-RS transmission occasions and N-Y aperiodic CSI-RS transmission occasions.

Y is equal to or smaller than N. Y can be larger or equals to 1.

In some implementation, the determined CSI includes at least one of PMI, CQI, or TDCP (Time domain channel property).

Embodiment 2

The UE determines N time domain CSI-RS transmission occasions for channel measurement and L CSI-RS and/or CSI-IM (interference measurement) occasions for interference measurement, and the UE determines CSI (channel state indication) of one CSI reporting based on the N time domain CSI-RS transmission occasions for channel measurement and the L CSI-RS and/or CSI-IM occasions for interference measurement.

The N can be larger than one.

The L can be equal to or smaller than N.

In some implementation, the L is larger equals to 1.

In some implementation, the L can be larger than N.

The N time domain CSI-RS transmission occasions for channel measurement (or the L CSI-RS and/or CSI-IM occasions for interference measurement) can correspond to one or multiple CSI-RS resources.

For example, the N time domain CSI-RS transmission occasions for channel measurement correspond to N time domain transmission occasions of one periodic CSI-RS resource/semi-persistent CSI-RS resource.

That is the N time domain CSI-RS transmission occasions for channel measurement correspond to N time domain transmission periods of one periodic CSI-RS resource/semi-persistent CSI-RS resource.

Alternatively, the N time domain CSI-RS transmission occasions for channel measurement corresponds to M CSI-RS resources.

M is equal to or smaller than N.

If N is equal to M, each of the N time domain CSI-RS transmission occasions for channel measurement corresponds to one CSI-RS resource.

In some implementation, the N CSI-RS resources is aperiodic CSI-RS resource.

As shown in FIG. 1, the UE determines the N time domain CSI-RS transmission occasions for channel measurement and L CSI-RS and/or CSI-IM occasions for interference measurement, and the UE predicts CSI on the following k time units based on the N time domain CSI-RS transmission occasions for channel measurement and L CSI-RS and/or CSI-IM occasions for interference measurement. The starting of the k time units can be the reference time unit with shaded part as shown in FIG. 2. The starting of the k time units can be a slot after the reference time unit with shaded part as shown in FIG. 2.

If the L is smaller than N, the UE gets N channel measurement and L interference measurement. The UE predict PMI on each of the following k time units and the UE reports one set of CQI shared by the k time units.

If the L is larger than one, the UE gets N channel measurement and L interference measurement.

The UE predict PMI on each of the k time units and more than one sets of CQI for the k time units. Each of the more than one sets of CQI corresponds to one sub set of the k time units. The UE predicts PMI on each of the following k time units and the UE reports one set of CQI shared by the k time units.

For example, the UE predicts 2 sets of CQI. The first set CQI corresponds to the first k/2 time units of the k time units and the second set CQI corresponds to the second k/2 time units pf the k time units. The UE reports the predicted PMI and more than one sets of CQI.

Different CQIs in one set of CQI correspond to different codewords or different frequency domain unit.

In some implementation, the UE predicts/reports PMI for each of the k time units and one set of CQI of the k time units. The one set of CQI applied to each of the k time units.

In some implementation, the UE predicts/reports PMI for each of the k time units and one set of CQI of the k time units. The one set of CQI corresponds to one the k time units.

In some implementation, the UE reports its capability of N and L. The N and L are determined by the reported value by the UE. Because the N and L depends the prediction algorithm of the UE.

In some implementation, the N and L are a fixed values agreed by the UE and gNB. In some implementation, the N and L are configured by the gNB using signaling.

In some implementation, the N is equal to or larger than 5 (or 10). For example, the N is one of 5, 8, 10, 15, 20, 25, 30, 22, 80, 87.

In some implementation, the L is equal to or larger than 5 (or 10, or 1). For example, the L is one of 1, 5, 8, 10, 22, 87, 15, 20, 25, 30, 80.

In some implementation, the UE determines at least N time domain CSI-RS transmission occasions for channel measurement and L CSI-RS and/or CSI-IM occasions for interference measurement and determines channel state indication (CSI) of one CSI reporting based on the N time domain CSI-RS transmission occasions for channel measurement and the L CSI-RS and/or CSI-IM occasions for interference measurement.

In some implementation, the N time domain CSI-RS transmission occasions for channel measurement and L CSI-RS and/or CSI-IM occasions for interference measurement is no later than one reference time unit as shown in FIG. 2. The reference time unit can be one slot.

In some implementation, the one reference unit can be named as CSI reference resource.

In some implementation, after an event happens (or in a time duration), the UE only reports the CSI after receiving at least the N time domain CSI-RS transmission occasions for channel measurement and L CSI-RS and/or CSI-IM occasions for interference measurement and the UE drops the CSI otherwise.

For example, the event includes at least one of the CSI report (re)configuration, serving cell activation, BWP change, or activation of SP-CSI.

If the N time domain CSI-RS transmission occasions for channel measurement (or L CSI-RS and/or CSI-IM occasions for interference measurement) corresponds to N CSI-RS resources (or L CSI-RS and/or CSI-IM resources), it means that the UE only reports the CSI after receiving at least one time domain CSI-RS transmission occasion of each of the N CSI-RS resource and the L CSI-RS and/or CSI-IM occasions for interference measurement and the UE drops the CSI otherwise.

In some implementation, when DRX is configured, the UE reports a CSI report only if receiving at least the N time domain CSI-RS transmission occasions for channel measurement and L CSI-RS and/or CSI-IM occasions for interference measurement in DRX Active Time no later than reference time unit and drops the report otherwise. If the N time domain CSI-RS transmission occasions for channel measurement corresponds to N CSI-RS resources, it means that the UE reports a CSI report only if receiving at least one time domain CSI-RS transmission occasion of each of the N CSI-RS resource and at least onetime domain occasions of each of the L CSI-RS and/or CSI-IM occasions for interference measurement in DRX Active Time no later than reference time unit and drops the report otherwise. The L CSI-RS and/or CSI-IM occasions can corresponds to L CSI-RS and/or CSI-IM resources.

In some implementation, the CSI of the one CSI reporting is reported in one reporting instance. Alternatively, the CSI of the one CSI reporting is reported in more than one reporting instance.

In some implementation, if the higher layer parameter timeRestrictionForInterferenceMeasurements is set to "notConfigured", the UE shall derive the interference measurements for computing CSI value reported in uplink slot n based on only the CSI-IM and/or NZP CSI-RS for interference measurement no later than the CSI reference time unit associated with the CSI resource setting.

In some implementation, if the higher layer parameter timeRestrictionForInterferenceMeasurements in CSI-ReportConfig is set to "Configured", the UE shall derive the interference measurements for computing the CSI value reported in uplink slot n based on the most recent, no later than the CSI reference time unit, L occasions of CSI-IM and/or NZP CSI-RS for interference measurement associated with the CSI resource setting of the CSI reporting.

If the higher layer parameter timeRestrictionForChannelMeasurements is set to "notConfigured", the UE shall derive the channel measurements for computing CSI value reported in uplink slot n based on only the NZP CSI-RS, no later than the CSI reference time unit, associated with the CSI resource setting.

If the higher layer parameter timeRestrictionForChannelMeasurements in CSI-ReportConfig is set to "Configured", the UE shall derive the channel measurements for computing CSI reported in uplink slot n based on only the most recent, no later than the CSI reference resource, N occasions of NZP CSI-RS associated with the CSI resource setting of the CSI reporting.

In some implementation, the UE determines N time domain CSI-RS transmission occasions for channel measurement, L CSI-RS and/or CSI-IM occasions for interference measurement and C CSI reference time units, and the UE determines CSI of one CSI reporting based on the N time domain CSI-RS transmission occasions for channel measurement and the L CSI-RS and/or CSI-IM occasions for interference measurement for the C CSI reference time units, where C is equals to 1 or larger than 1.

Each of the C CSI reference time units corresponds to at least one of one precoding matrix indicator, one set of CQI, or one set of CQI.

If at least one of the C CSI reference time units is not one available downlink slot, the UE will drop the CSI reports corresponds the C CSI reference time units.

Alternatively, if one or more of the C CSI reference time units is not one available downlink slot, the UE will drop the CSI reports corresponds the one or more CSI reference time units and reports the CSI corresponds to the remaining reference time units of the C CSI reference time units which is available downlink unit.

In a third implementation, If at least one of the C CSI reference time units is not one available downlink slot, the UE will report the CSI reports corresponds to another reference time units which is in the C CSI reference time units.

A slot in a serving cell shall be considered to be a valid downlink slot if it comprises at least one higher layer configured downlink or flexible symbol and it does not fall within a configured measurement gap for that UE.

For example, as shown in FIG. 1 or FIG. 2, the C CSI reference time units includes the k time units.

In some implementation, the UE reports the C as its capability. In some implementation, the C is configured by the gNB.

The N time domain CSI-RS transmission occasions include more than one type CSI-RS transmission occasions. The more than one type of CSI-RS transmission occasions include at least two of a periodic, semi-persistent and aperiodic CSI transmission occasion.

For example, the N time domain CSI-RS transmission occasions includes at least two of Y periodic/semi-persistent CSI-RS transmission occasions and N-Y aperiodic CSI-RS transmission occasions. Y is smaller than N.

Similarly, the UE determines L time domain CSI-IM transmission occasions and determines CSI (channel state indication) of one CSI reporting. The L time domain CSI-IM transmission occasions include more than one type of CSI-IM transmission occasions. The more than one type of CSI-IM transmission occasions include at least two of a periodic, semi-persistent and aperiodic CSI transmission occasion.

For example, the L time domain CSI-IM transmission occasions includes Y periodic/semi-persistent CSI-RS transmission occasions and L-Y aperiodic CSI-RS transmission occasions. Y is smaller than L.

In some implementation, the determined CSI includes at least one of PMI, CQI, or TDCP (Time domain channel property).

Embodiment 3

The UE determines X CSI reference time units, wherein the X is larger than 1.

In some implementation, the X CSI reference time units or some of the X CSI reference time units can be named as CSI reference resource.

In some implementation, the X CSI reference time units include more than one types CSI reference time unit.

For example, the X CSI reference time units includes two types of CSI reference time unit.

The first type of two types of CSI reference time unit is to ensure UE has received enough CSI-RS to estimation.

The second type of two types of CSI reference time unit is used to define/calculate the CQI/PMI.

For example, the second type of CSI reference time units includes the k CSI reference time units. The UE predicts precoding matrix for each of the k CSI reference time units. The starting/first of the second type of CSI reference time units can be the time unit corresponding to the reporting time unit.

Alternative, the starting/first of the second type of CSI reference time units can be after the time unit corresponding to the reporting time unit.

As shown in FIG. 3, the first type of the two types of CSI reference time unit is before the report time unit where the UE reports the one CSI reports.

The N time domain CSI-RS transmission occasions in embodiment 1 is no later than the first type of CSI reference time unit, or the N time domain CSI-RS transmission occasions for channel measurement and L CSI-RS and/or CSI-IM occasions for interference measurement are no later than the first type of CSI reference time unit.

The UE predicts precoding matrix for each of the k CSI reference time units. The second type CSI reference time units are not before the time unit corresponding to the reporting time units.

In some implementation, the gap between the first time unit of the second type CSI reference time unit and the reporting time unit is configured by gNB. As shown in FIG. 3, the k0 can be configured by gNB.

In some implementation, the gap between the first time unit of the second type CSI reference time unit and the reporting time unit is a fixed value. For example, the gap is one or more OFDM symbols (or one or more slots).

In some implementation, the gap between the first time unit of the second type CSI reference time unit and the reporting time unit is a fixed value. For example, the gap is determined by at least one of the gap the N CSI-RS time domain occasions, or the periodicity of the CSI-RS resource for channel measurement.

In some implementation, the gap between the first time unit of the second type CSI reference time unit and the reporting time unit is reported by the UE as UE capability. In some implementation, the UE reports precoding matrix and/or CQI for each of the first type of CSI reference time unit and the second type of CSI reference time unit.

In some implementation, the first type CSI reference time unit includes one time unit.

In some implementation, the gap between the first type CSI reference time unit and the reporting time unit is determined by at least one of the value of X, whether the CSI reporting includes precoding matrix and/or CQI for the second type of CSI reference time units.

For example, the smaller the X, the smaller the gap. Compared with one first CSI reporting which does not include precoding matrix and/or CQI for the second type of CSI reference time units, the gap is larger for one second CSI reporting which includes precoding matrix and/or CQI for the second type of CSI reference time units.

In some implementation, the second type CSI reference time unit includes more than one time units.

A slot in a serving cell shall be considered to be a valid downlink slot if it comprises at least one higher layer configured downlink or flexible symbol, and it does not fall within a configured measurement gap for that UE.

In some implementation, if there is no valid downlink slot for the first type of CSI reference time unit corresponding to a CSI Report Setting in a serving cell, CSI reporting is omitted for the serving cell in uplink slot n where the UE reports the CSI reports.

In some implementation, if there is no valid downlink slot for the first type of CSI reference time unit corresponding to a CSI Report Setting in a serving cell, CSI reporting corresponding to the first type of CSI reference time unit is omitted for the serving cell in uplink slot n where the UE reports the CSI reports.

In some implementation, if there is no valid downlink slot for at least one of the second type of CSI reference time unit corresponding to a CSI Report Setting in a serving cell, CSI reporting corresponding to the first type of CSI reference time unit is omitted for the serving cell in uplink slot n where the UE reports the CSI reports.

In some implementation, if there is no valid downlink slot for some of the second type of CSI reference time unit and there is at least one valid downlink slot for at least one the second type of CSI reference time unit corresponding to a CSI Report Setting in a serving cell, CSI reporting is omitted for the unavailable downlink of the second type of CSI reference time unit and only reports the CSI for the available downlink of the second type of CSI reference time unit of the serving cell in uplink slot n where the UE reports the CSI reports.

In some implementation, the UE reports the number of the available downlink of the second type of CSI reference time unit in the CSI reporting.

Alternatively, the UE does not report the number of the available downlink of the second type of CSI reference time unit in the CSI reporting because the gNB know the number based on the downlink or flexible symbol configuration and measurement gap configuration.

In some implementation, after an event (or in DRX Active Time), if there are smaller than N time domain CSI-RS transmission occasions for channel measurement and/or smaller than L CSI-RS and/or CSI-IM occasions for interference measurement no later the first type of CSI reference time unit, the one CSI reporting only corresponding to the first type of CSI reference time unit is reported. The X is one. The UE only reports PMI and/or CQI corresponds to the first type of CSI reference time unit.

In some implementation, after an event (or in DRX Active Time), the UE reports precoding matrix and/or CQI for each of the first type of CSI reference time unit and the second type of CSI reference time unit if there are the N time domain CSI-RS transmission occasions for channel measurement and L CSI-RS and/or CSI-IM occasions for interference measurement no later the first type of CSI reference time unit.

In some implementation, after an event (or in DRX Active Time), the UE reports precoding matrix and/or CQI for the second type of CSI reference time unit if there are the N time domain CSI-RS transmission occasions for channel measurement and L CSI-RS and/or CSI-IM occasions for interference measurement no later the first type of CSI reference time unit. After the event (or in DRX Active Time), the UE reports precoding matrix and/or CQI only for the first type of CSI reference time unit if there is the time domain CSI-RS transmission occasions for channel measurement which is smaller than N and/or CSI-RS and/or CSI-IM occasions for interference measurement which is smaller than L no later the first type of CSI reference time unit. After the event (or in DRX Active Time), the UE drop the one reporting if there is not at least one time domain CSI-RS transmission occasions for channel measurement and/or no CSI-RS and/or CSI-IM occasions for interference measurement no later the first type of CSI reference time unit.

In some implementation, after an event (or in DRX Active Time), the UE not reports precoding matrix and/or CQI for the second type of CSI reference time unit if there not the N time domain CSI-RS transmission occasions for channel measurement and/or L CSI-RS and/or CSI-IM occasions for interference measurement no later than the first type of CSI reference time unit.

In some implementation, the UE reports more than one CQI for the X CSI reference time units or for the k second type of CSI reference time units, the UE reports index of a CSI reference time units corresponds to strongest CQI among the X CSI reference time units or for the k second type of CSI reference time units. Other CQI is reported using difference methods which are related to the strongest CQI(s).

In some implementation, when periodic or semi-persistent CSI-RS/CSI-IM or SSB is used for channel/interference measurements, the UE is not expected to measure channel/interference on the CSI-RS/CSI-IM/SSB whose last OFDM symbol is received up to Z' symbols before transmission time of the first OFDM symbol of aperiodic CSI reporting. The Z' is determined by at least one of the value of X, whether the CSI reporting includes precoding matrix and/or CQI for the second type of CSI reference time units. For example, the smaller the X, the smaller the Z'. Compared with one first CSI reporting which does not include precoding matrix and/or CQI for the second type of CSI reference time units, the Z' is larger for one second CSI reporting which includes precoding matrix and/or CQI for the second type of CSI reference time units.

In some implementation, like determining the Z', the Z is determined by at least one of the values of X, whether the CSI reporting includes precoding matrix and/or CQI for the second type of CSI reference time units. For example, the smaller the X, the smaller the Z. Compared with one first CSI reporting which does not include precoding matrix and/or CQI for the second type of CSI reference time units, the Z is larger for one second CSI reporting which includes precoding matrix and/or CQI for the second type of CSI reference time units. The Z is the gap between the DCI triggering the aperiodic (or semi-persistent CSI reporting) and the PUSCH/PUCCH including the CSI reporting.

In some implementation, for calculating CQI, the UE assumes same parameter for each of the X CSI reference time units or for each of the k second type of reference time units. For example, the parameter includes at least one of: the number of OFDM symbols occupied by control signaling, the number of PDSCH and DMRS, the bandwidth part subcarrier spacing, the bandwidth, the CP length and subcarrier spacing, resource elements used by primary or secondary synchronization signals or PBCH, Redundancy Version 0, the ratio of PDSCH EPRE to CSI-RS EPRE, REs allocated for NZP CSI-RS and ZP CSI-RS, the number of front-loaded DM-RS symbols, the same number of additional DM-RS symbols, whether the PDSCH symbols containing DM-RS and PRB bundling size.

In some implementation, the X CSI reference time units includes a third type of CSI reference time unit corresponding to PMI and a fourth type of CSI reference time unit corresponding to CQI. For example, the one of the k second type of CSI reference time units corresponds to CQI and each of the k second type corresponds to one set of PMI. The third type of CSI reference time unit includes the one of the k second type of CSI reference time units and the fourth type of CSI reference time unit includes the k second type of CSI referent time units.

In some implementation, the third type of CSI reference time units and the fourth type of CSI time units includes same set of time units.

In some implementation, if the reporting includes CSI reports in the second type of CSI reference time unit, then the timeRestrictionForChannelMeasurements should not be configured.

In some implementation, if the reporting includes CSI reports in the second type of CSI reference time unit, then the timeRestrictionForInterferenceMeasurements should not be configured.

In some implementation, the determined CSI includes at least one of PMI, CQI, or TDCP (Time domain channel property).

Figure 6:
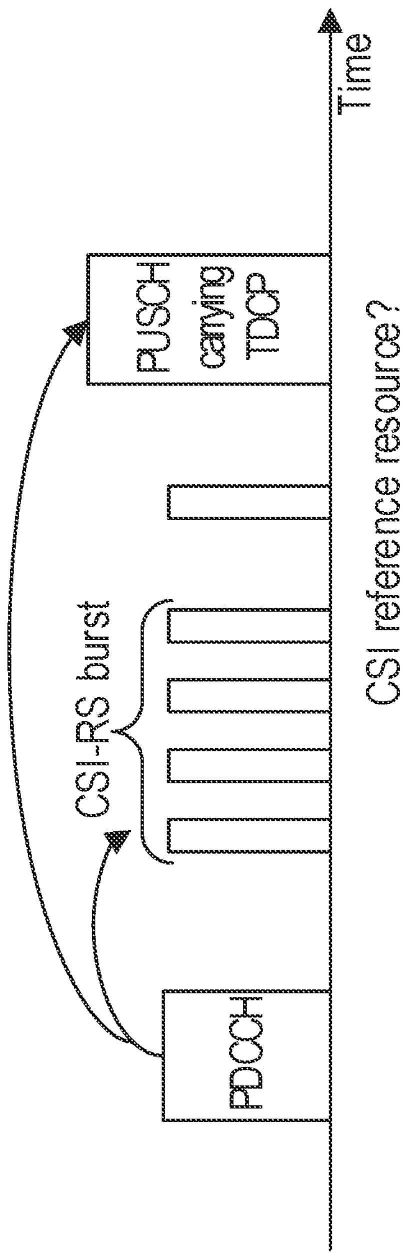
FIG. 6 provides an another exemplary diagrams of a gap between PUSCH including reported aperiodic CSI and PDCCH triggering aperiodic CSI, and a reference time unit.

In some implementation, as shown in FIG. 6, the TDCP corresponds to one or more reference time unit and based on the N time domain transmission occasions of channel measurement.

Embodiment 4

The UE determines N time domain CSI-RS transmission occasions and determines CSI of one CSI reporting based on N time domain CSI-RS transmission occasions.

The N is larger than one.

The N time domain CSI transmission occasion can be for channel measurement as shown in Example 1, 2 or 3.

Alternative, the N time domain CSI transmission occasion can be for interference measurement as shown in Example 1, 2 or 3.

The N time domain CSI-RS transmission occasions include more than one type CSI-RS transmission occasions.

The more than one types of CSI-RS transmission occasions include a periodic, semi-persistent and aperiodic CSI transmission occasion.

For example, the N time domain CSI-RS transmission occasions includes Y periodic/semi-persistent CSI-RS transmission occasions and N-Y aperiodic CSI-RS transmission occasions. Y is smaller than N.

Similarly, the UE determines L time domain CSI-IM transmission occasions and determines CSI (channel state indication) of one CSI reporting. The L time domain CSI-RS transmission occasions include more than one type of CSI-RS transmission occasions. The type CSI-IM transmission occasions include a periodic, semi-persistent and aperiodic CSI transmission occasion.

For example, the L time domain CSI-RS transmission occasions includes Y periodic/semi-persistent CSI-RS transmission occasions and L-Y aperiodic CSI-RS transmission occasions. Y is smaller than L.

In some implementation, the CSI reporting is aperiodic CSI reporting.

In some implementation, the determined CSI includes at least one of PMI, CQI, or TDCP (Time domain channel property).

Embodiment 5

The CMR of one CSI reporting includes more than one type of CSI-RS resource. The type CSI-RS resource include a periodic, semi-persistent and aperiodic CSI CSI-RS resource. For example, the CMR of the one CSI reporting includes N1 CSI-RS resources set. The N1 CSI-RS resource sets includes Y1 periodic CSI-RS resource set and N1-Y1 aperiodic CSI-RS resource set. N1 is larger than 1. Y1 is smaller than N1.

Figure 4:
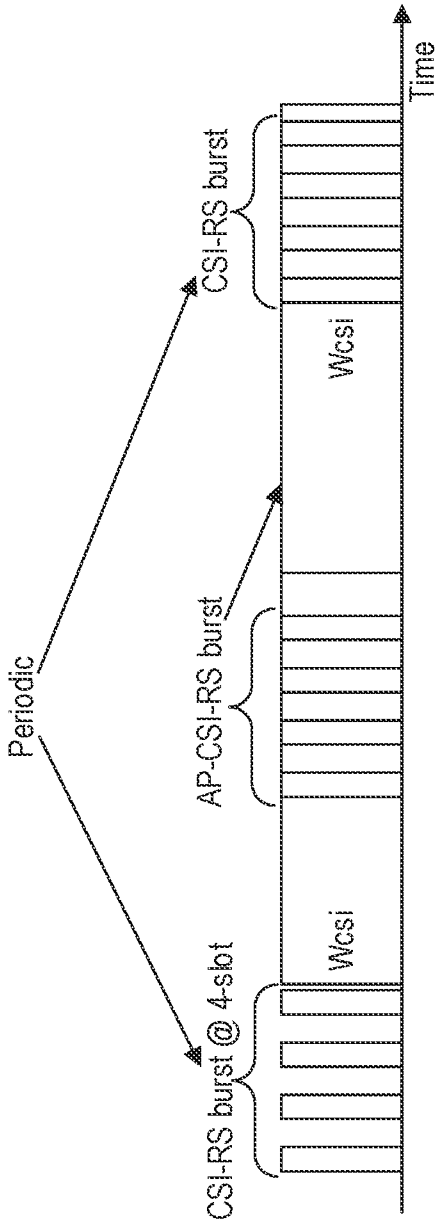
FIG. 4 provides an exemplary diagrams of one CSI reporting corresponds to more than one types of channel state measurement resource, such as periodic and aperiodic.
Figure 5:
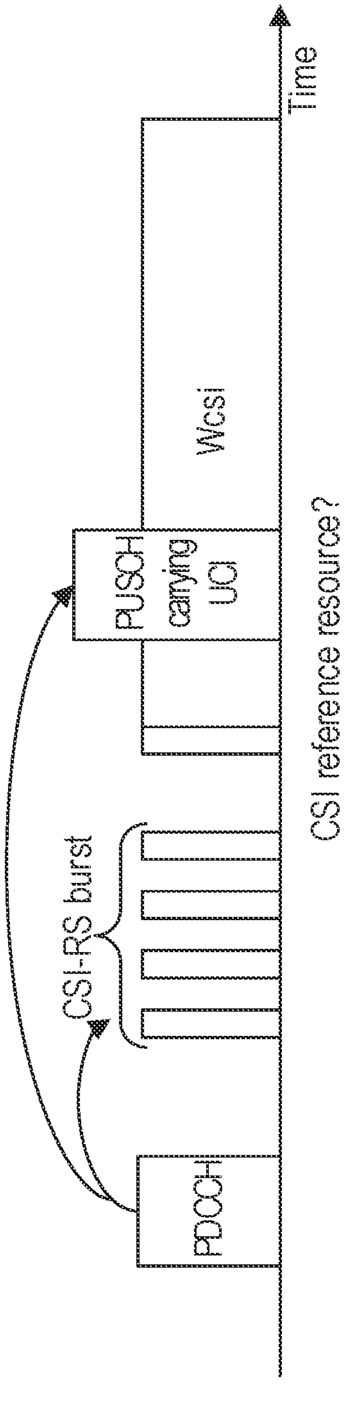
FIG. 5 provides an exemplary diagrams of a gap between PUSCH including reported aperiodic CSI and PDCCH triggering aperiodic CSI, and a reference time unit.

As shown in FIG. 4, one CSI reporting includes one periodic CSI-RS set and one aperiodic set. Each of the one periodic CSI-RS set and one aperiodic set includes one or more CSI-RS resources.

Embodiment 6

The trigger offset for one semi-persistent/aperiodic CSI-RS resource set can be more than one of 32-127 even for CSI-RS with 15 kHz sub-carrier space.

In this application, one CSI reporting corresponds to one setting of CSI configuration, such as one CSI report corresponds to one CSI Report configuration.

Figure 7:
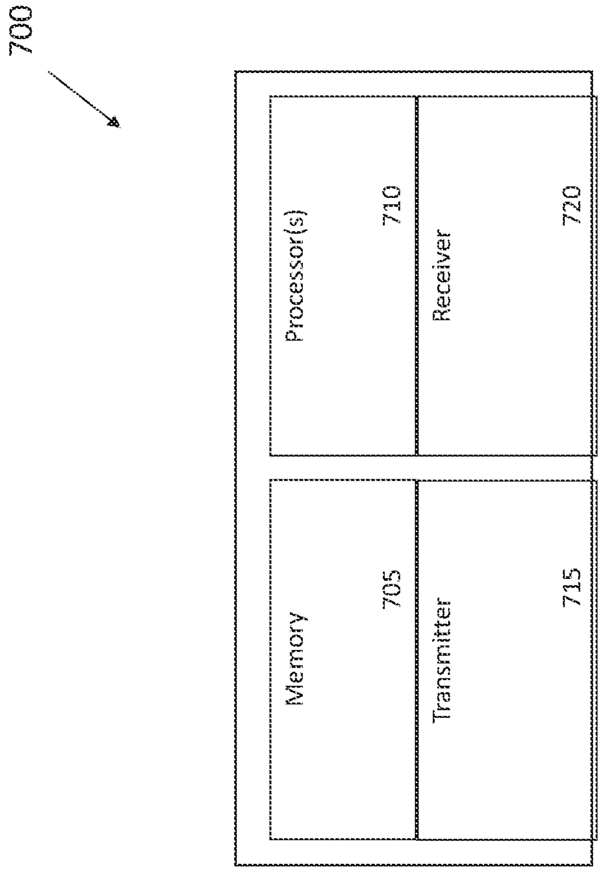
FIG. 7 shows an exemplary block diagram of a hardware platform that may be a part of a network device or a communication device.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 610 configure the hardware platform 700 to perform the operations described in FIGS. 1 to 5 and 7 and in the various embodiments described in this patent document. The transmitter 715 transmits or sends information or data to another device. For example, a network device transmitter can send a message to user equipment. The receiver 720 receives information or data transmitted or sent by another device. For example, user equipment can receive a message from a network device.

Figure 8:
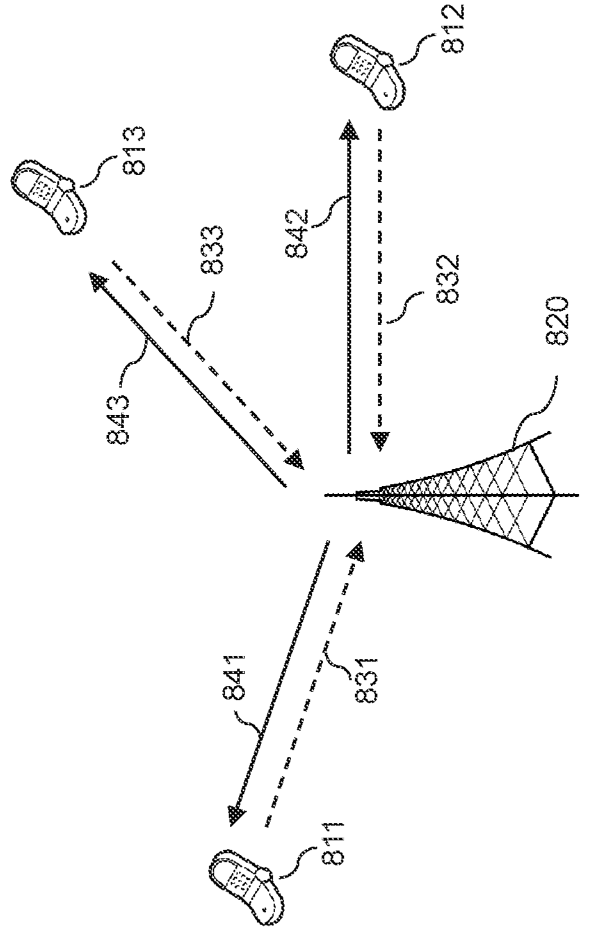
FIG. 8 shows an example of wireless communication including a base station (BS) and user equipment (UE) based on some implementations of the disclosed technology.

The implementations as discussed above will apply to a wireless communication. FIG. 8 shows an example of a wireless communication system (e.g., a 5G or NR cellular network) that includes a base station 820 and one or more user equipment (UE) 811, 812 and 813. In some embodiments, the UEs access the BS (e.g., the network) using a communication link to the network (sometimes called uplink direction, as depicted by dashed arrows 831, 832, 833), which then enables subsequent communication (e.g., shown in the direction from the network to the UEs, sometimes called downlink direction, shown by arrows 841, 842, 843) from the BS to the UEs. In some embodiments, the BS send information to the UEs (sometimes called downlink direction, as depicted by arrows 841, 842, 843), which then enables subsequent communication (e.g., shown in the direction from the UEs to the BS, sometimes called uplink direction, shown by dashed arrows 831, 832, 833) from the UEs to the BS. The UE may be, for example, a smartphone, a tablet, a mobile computer, a machine to machine (M2M) device, an Internet of Things (IoT) device, and so on.

Figure 9:
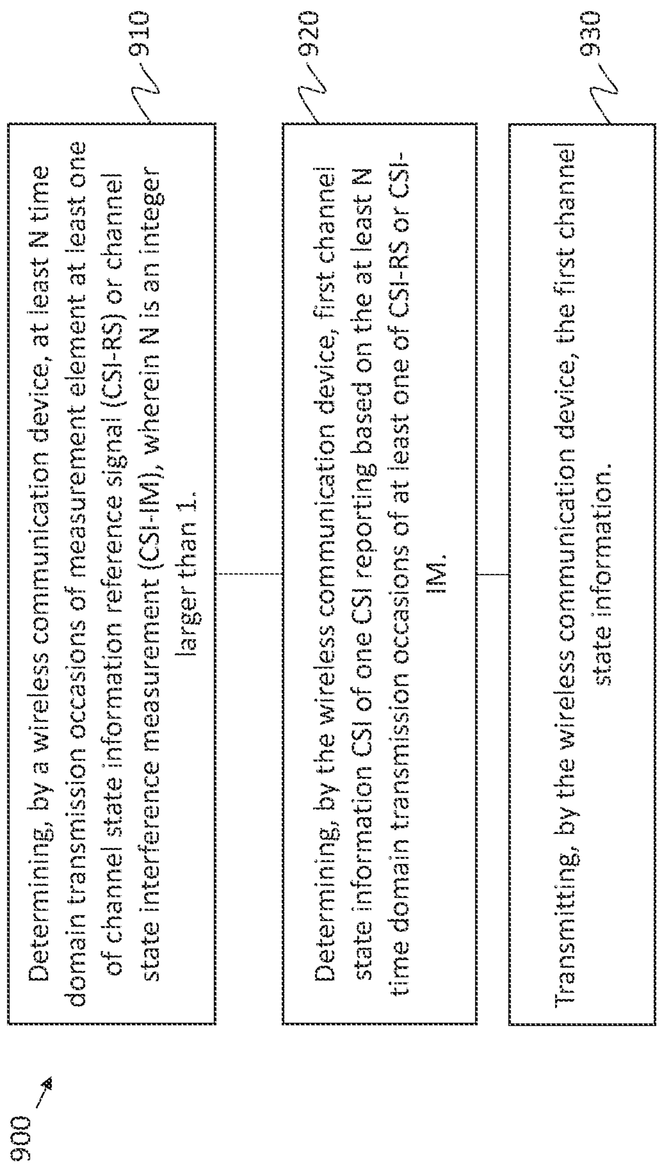
FIGS. 9-12 show multiple examples of a process for wireless communication based on some example embodiments of the disclosed technology.

FIG. 9 shows an example of a process for wireless communication based on some example embodiments of the disclosed technology.

In some embodiments of the disclosed technology, a wireless communication method 900 includes, at 910, determining, by a wireless communication device, at least N time domain transmission occasions of measurement element at least one of channel state information reference signal (CSI-RS) or channel state interference measurement (CSI-IM), wherein N is an integer larger than 1, at 920, determining, by the wireless communication device, first channel state information CSI of one CSI reporting based on the at least N time domain transmission occasions of at least one of CSI-RS or CSI-IM, and at 930, transmitting, by the wireless communication device, the first channel state information.

Figure 10:
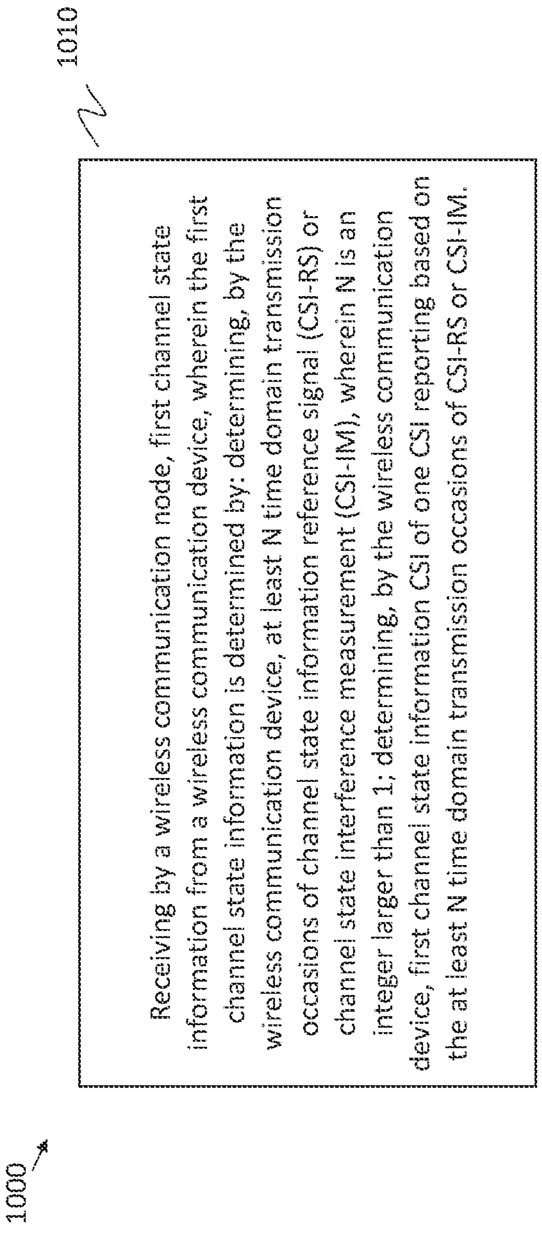

FIG. 10 shows an example of a process for wireless communication based on some example embodiments of the disclosed technology.

In some embodiments of the disclosed technology, a wireless communication method 1000 includes, at 1010, receiving by a wireless communication node, first channel state information from a wireless communication device, wherein the first channel state information is determined by: determining, by the wireless communication device, at least N time domain transmission occasions of channel state information reference signal (CSI-RS) or channel state interference measurement (CSI-IM), wherein N is an integer larger than 1; determining, by the wireless communication device, first channel state information CSI of one CSI reporting based on the at least N time domain transmission occasions of CSI-RS or CSI-IM.

Figure 11:
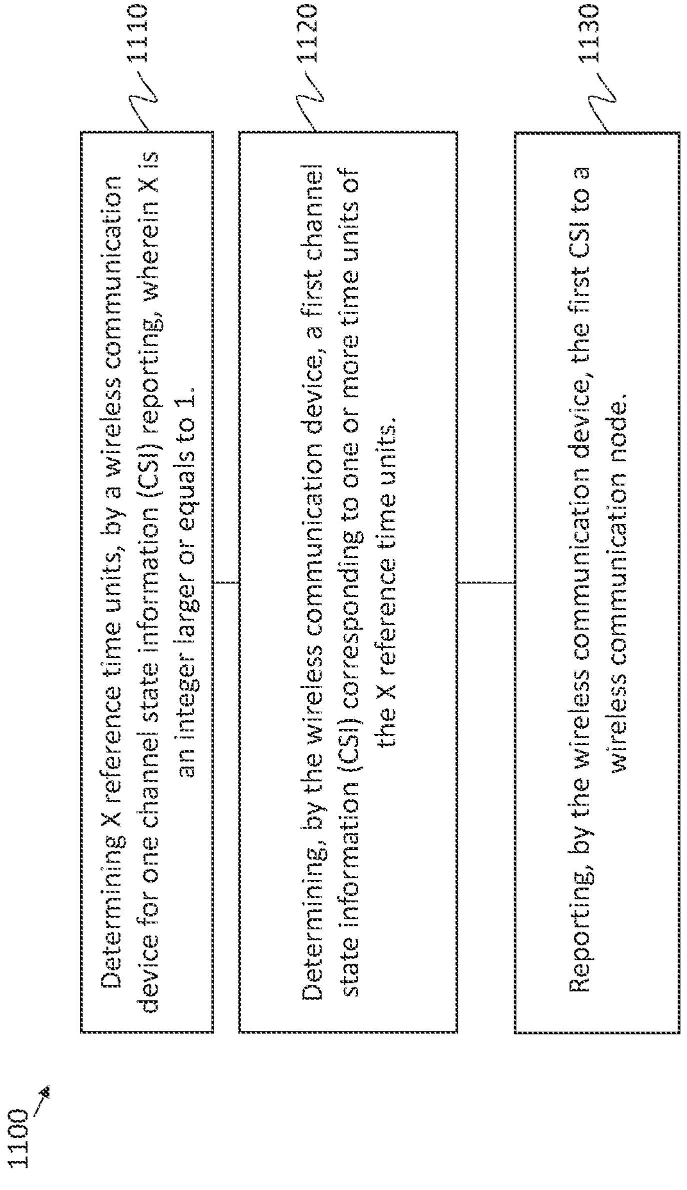

FIG. 11 shows an example of a process for wireless communication based on some example embodiments of the disclosed technology.

In some embodiments of the disclosed technology, a wireless communication method 1100 includes, at 1110, determining X reference time units, by a wireless communication device for one channel state information (CSI) reporting, wherein X is an integer larger or equals to 1, at 1120, determining, by the wireless communication device, a first channel state information (CSI) corresponding to one or more time units of the X reference time units, and at 1130, reporting, by the wireless communication device, the first CSI to a wireless communication node.

Figure 12:
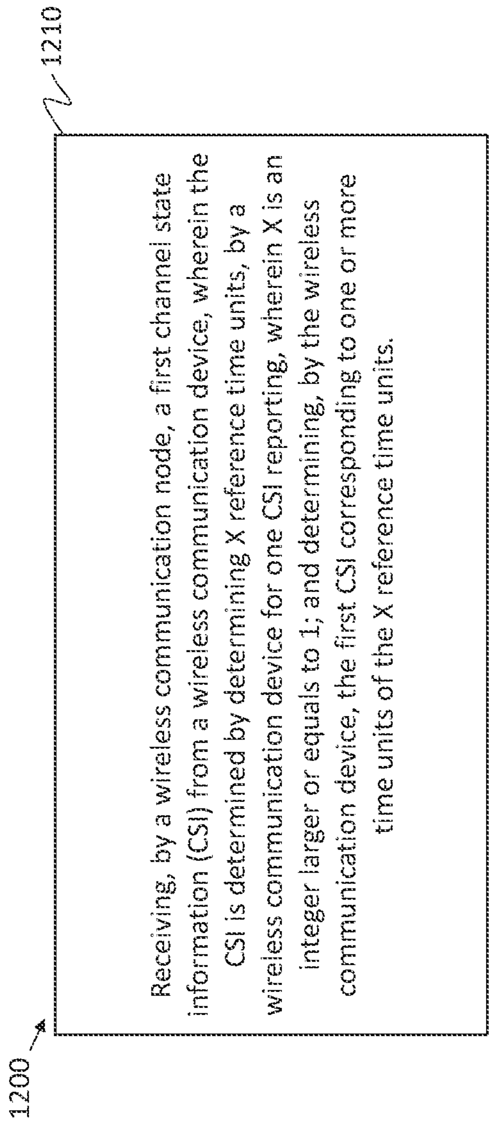

FIG. 12 shows an example of a process for wireless communication based on some example embodiments of the disclosed technology.

In some embodiments of the disclosed technology, a wireless communication method 1200 includes, at 1210, receiving, by a wireless communication node, a first channel state information (CSI) from a wireless communication device, wherein the CSI is determined by determining X reference time units, by a wireless communication device for one CSI reporting, wherein X is an integer larger or equals to 1; and determining, by the wireless communication device, the first CSI corresponding to one or more time units of the X reference time units.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Through above method and system, the UE can predict CSI for some reference time units and trace well the fast changed channel. The overhead of reporting CSI is reduced. The method of reporting CSI in the case where less than N/L or no time domain occasions no later than a first reference time unit is received by the UE, is provided. Then the UE and gNB can well know the CSI in this case without additional signaling. The gNB can know at least a second CSI in this case, then the gNB can well schedule the UE in this case.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:

determining continuous time units, by a wireless communication device, for one channel state information (CSI) reporting, wherein k is an integer greater than 1, determining, by the wireless communication device, a first CSI corresponding to the k continuous time units; and reporting, by the wireless communication device to a wireless communication node, the first CSI in a reporting slot, wherein the first CSI includes a precoding matrix indication (PMI) indicating k predicted precoding matrix for each of the k continuous time units, wherein the k continuous time units are not before the reporting slot, wherein a starting of the k continuous time units is one of a CSI reference time unit or a slot after a CSI reference time unit, and wherein the CSI reference time unit is before the reporting slot.

2. The method of claim 1, further comprising:

determining, by the wireless communication device, at least N time-domain transmission occasions of a channel state information reference signal (CSI-RS) for channel measurement and L transmission occasions of a channel state interference measurement (CSI-IM) resource, wherein N is an integer greater than 1, L is less than N, and wherein the at least N time-domain transmission occasions correspond to M CSI-RS resources, M being equal to or less than N;

determining, by the wireless communication device, the first CSI of one CSI reporting based on the at least N time-domain transmission occasions of the CSI-RS and L transmission occasions of the CSI-IM resource; and transmitting, by the wireless communication device, the first CSI.

3. The method of claim 2, further comprising:

dropping and not reporting, by the wireless communication device, the first CSI if a condition is not satisfied.

4. The method of claim 3, wherein the condition comprises at least one of:

receiving, by the wireless communication device, at least N time-domain transmission occasions of a channel state information reference signal (CSI-RS) for channel measurement no later than the CSI reference time unit after an event, wherein N is an integer greater than 1;

receiving, by the wireless communication device, at least L time-domain transmission occasions of one interference measurement resource no later than the CSI reference time unit after an event, wherein L is less than N, and N is an integer greater than 1;

receiving, by the wireless communication device, at least N time-domain transmission occasions of a CSI-RS for channel measurement no later than the CSI reference time unit in a discontinuous reception (DRX) active time, wherein N is an integer greater than 1;

receiving, by the wireless communication device, at least L time-domain transmission occasions of one interference measurement resource no later than the CSI reference time unit in a DRX active time, wherein L is less than N, and N is an integer greater than 1;

receiving, by the wireless communication device, at least N time-domain transmission occasions of a CSI-RS for channel measurement no later than the CSI reference time unit in an active duration of a configured parameter, wherein N is an integer greater than 1; or receiving, by the wireless communication device, at least L time-domain transmission-occasions of one interference measurement resource no later than the CSI reference time unit in an active duration of a configured parameter, wherein L is less than N, and N is an integer greater than 1;

wherein the event is at least one of the following: 1) CSI report configuration, 2) CSI report reconfiguration, 3) serving cell activation, 4) bandwidth part (BWP) change, or 5) activation of semi-persistent CSI (SP-CSI), wherein N is included in a capacity report reported by the wireless communication device to the wireless communication node.

5. The method of claim 2, wherein the at least N time-domain transmission occasions correspond to M CSI-RS resources, wherein M is an integer, and wherein the correspondence comprises at least one of:

N time-domain transmission occasions of one periodic CSI-RS resource, wherein M=1;

N time-domain transmission occasions of one semi-persistent CSI-RS resource, wherein M=1; or N time-domain CSI-RS transmission occasions each corresponding to a respective CSI-RS resource, wherein M=N and the N CSI-RS resources are N aperiodic CSI-RS resources.

6. The method of claim 1, wherein a gap between the starting of the k continuous time units and the reporting slot including the first CSI is determined by signaling received by the wireless communication device.

7. The method of claim 1, wherein the first CSI includes one of the following:

a channel quality indicator (CQI) for each time unit in a second time unit set, wherein the second time unit set includes time units of the k continuous time units;

one set of CQI, wherein the one set of CQI corresponds to one of the k continuous time units, the one set of CQI includes one or more CQIs, and different CQIs in the one set of CQI correspond to different codewords or different frequency domain units when the one set of CQI includes more than one CQI; or more than one set of CQI, wherein each of the more than one set of CQI corresponds to one subset of the k continuous time units, and the more than one set of CQI correspond to more than one subset of the k continuous time units, wherein each of the more than one set of CQI includes one or more CQIs, and different CQIs in each set of CQI correspond to different codewords or different frequency domain units when the each set of CQI includes more than one CQI.

8. The method of claim 1, wherein each of the k continuous time units includes more than one slot.

9. A wireless communication method, comprising:

receiving, by a wireless communication node from a wireless communication device, a first channel state information (CSI) in a reporting slot, wherein the first CSI is determined by the wireless communication device, wherein the first CSI corresponds to the k continuous time units for one CSI reporting, wherein k is an integer greater than 1, wherein the first CSI includes a precoding matrix indication (PMI) indicating k predicted precoding matrix for each of the k continuous time units, wherein the k continuous time units are not before the reporting slot, wherein starting of the k continuous time units is one of a CSI reference time unit or a slot after a CSI reference time unit, and wherein the CSI reference time unit is before the reporting slot.

10. The method of claim 9, wherein a gap between the starting of the k continuous time units and the reporting slot including the first CSI is determined by signaling received by the wireless communication device.

11. The method of claim 9, wherein the first CSI includes one of the following, a channel quality indicator (CQI) for each time units in a second time unit set, and wherein the second time unit set includes time units of the k continuous time units;

one set of CQI, wherein the one set of CQI corresponds to one of the k continuous time units, the one set of CQI includes one or more CQIs, and different CQIs in the one set of COI correspond to different codewords or different frequency domain units when the one set of COI includes more than one CQI: or more than one set of CQI wherein each of the more than one set of CQI corresponds to one subset of the k continuous time units, and the more than one set of CQI correspond to more than one subset of the k continuous time units, wherein each of the more than one set of COI includes one or more CQIs, and different CQIs in each set of CQI correspond to different codewords or different frequency domain units when the each set of CQI includes more than one CQI.

12. The method of claim 9, further comprising:

stopping receiving, by the wireless communication node, the first CSI if a condition is not satisfied.

13. The method of claim 12, wherein the condition comprises at least one of:

receiving, by the wireless communication device, at least N time-domain transmission occasions of a channel state information reference signal (CSI-RS) for channel measurement no later than the CSI reference time unit after an event, wherein N is an integer greater than 1;

receiving, by the wireless communication device, at least L time-domain transmission occasions of one interference measurement resource no later than the CSI reference time unit after an event, wherein L is less than N, and N is an integer greater than 1;

receiving, by the wireless communication device, at least N time-domain transmission occasions of a CSI-RS for channel measurement no later than the CSI reference time unit in a discontinuous reception (DRX) active time, wherein N is an integer greater than 1;

receiving, by the wireless communication device, at least L time-domain transmission occasions of one interference measurement resource no later than the CSI reference time unit in a DRX active time, wherein L is less than N, and N is an integer greater than 1;

receiving, by the wireless communication device, at least N time-domain transmission occasions of a CSI-RS for channel measurement no later than the CSI reference time unit in an active duration of a configured parameter, wherein N is an integer greater than 1; or receiving, by the wireless communication device, at least L time-domain transmission occasions of one interference measurement resource no later than the CSI reference time unit in an active duration of a configured parameter, wherein L is less than N, and N is an integer greater than 1;

wherein the event is at least one of the following: 1) CSI report configuration, 2) CSI report reconfiguration, 3) serving cell activation, 4) bandwidth part (BWP) change, or 5) activation of semi-persistent CSI (SP-CSI);

wherein N is included in a capacity reporting reported by the wireless communication device to the wireless communication node.

14. An apparatus for wireless communication, comprising: at least one processor configured to implement a method, the at least one processor configured to:

determine continuous time units, by a wireless communication device, for one channel state information (CSI) reporting, wherein k is an integer greater than 1, determine, by the wireless communication device, a first (CSI) corresponding to the k continuous time units; and report, by the wireless communication device to a wireless communication node, the first CSI in a reporting slot, wherein the first CSI includes a precoding matrix indication (PMI); indicating k predicted precoding matrix for each of the k continuous time units, wherein the k continuous time units are not before the reporting slot, wherein a starting of the k continuous time units is one of a CSI reference time unit or a slot after a CSI reference time unit, and wherein the CSI reference time unit is before the reporting slot.

15. The apparatus of claim 14, wherein the at least one processor is further configured to:

determine, by the wireless communication device, at least N time-domain transmission occasions of a channel state information reference signal (CSI-RS) for channel measurement and L transmission occasions of a channel state interference measurement (CSI-IM) resource, wherein N is an integer greater than 1, L is less than N, and wherein the at least N time-domain transmission occasions correspond to M CSI-RS resources, M being equal to or less than N;

determine, by the wireless communication device, the first CSI of one CSI reporting based on the at least N time-domain transmission occasions of the CSI-RS and L transmission occasions of the CSI-IM resource; and transmit, by the wireless communication device, the first CSI.

16. The apparatus of claim 15, further comprising:

dropping and not reporting, by the wireless communication device, the first CSI if a condition is not satisfied, wherein the condition comprises at least one of:

receiving, by the wireless communication device, at least N time-domain transmission occasions of a channel state information reference signal (CSI-RS) for channel measurement no later than the CSI reference time unit after an event, wherein N is an integer greater than 1;

receiving, by the wireless communication device, at least L time-domain transmission occasions of one interference measurement resource no later than the CSI reference time unit after an event, wherein L is less than N, and N is an integer greater than 1;

receiving, by the wireless communication device, at least N time-domain transmission occasions of a CSI-RS for channel measurement no later than the CSI reference time unit in a discontinuous reception (DRX) active time, wherein N is an integer greater than 1;

receiving, by the wireless communication device, at least L time-domain transmission occasions of one interference measurement resource no later than the CSI reference time unit in a DRX active time, wherein L is less than N, and Nis an integer greater than 1;

receiving, by the wireless communication device, at least N time-domain transmission occasions of a CSI-RS for channel measurement no later than the CSI reference time unit in an active duration of a configured parameter, wherein N is an integer greater than 1; or receiving, by the wireless communication device, at least L time-domain transmission occasions of one interference measurement resource no later than the CSI reference time unit in an active duration of a configured parameter, wherein L is less than N, and Nis an integer greater than 1;

wherein the event is at least one of the following: 1) CSI report configuration, 2) CSI report reconfiguration, 3) serving cell activation, 4) bandwidth part (BWP) change, or 5) activation of semi-persistent CSI (SP-CSI);

wherein N is included in a capacity report reported by the wireless communication device to the wireless communication node.

17. The apparatus of claim 14, wherein a gap between the starting of the k continuous time units and the reporting slot including the first CSI is determined by signaling received by the wireless communication device.

18. The apparatus of claim 14, wherein the first CSI includes one of the following:

a channel quality indicator (CQI) for each time unit in a second time unit set, wherein the second time unit set includes time units of the k continuous time units;

one set of CQI, wherein the one set of CQI corresponds to one of the k continuous time units, the one set of CQI includes one or more CQIs, and different CQIs in the one set of CQI correspond to different codewords or different frequency domain units when the one set of CQI includes more than one CQI; or more than one set of CQI, wherein each of the more than one set of CQI corresponds to one subset of the k continuous time units, and the more than one set of CQI correspond to more than one subset of the k continuous time units, wherein each of the more than one set of CQI includes one or more CQIs, and different CQIs in each set of CQI correspond to different codewords or different frequency domain units when the each set of CQI includes more than one CQI.

19. An apparatus for wireless communication, comprising: at least one processor configured to implement a method, the at least one processor configured to:

receive, by a wireless communication node from a wireless communication device, a first channel state information (CSI) in a reporting slot, wherein the first CSI is determined by the wireless communication device, wherein the first CSI corresponds to the k continuous time units for one CSI reporting, wherein k is an integer greater than 1, wherein the first CSI includes a precoding matrix indication (PMI) indicating k predicted precoding matrix for each of the k continuous time units, wherein the k continuous time units are not before the reporting slot, wherein a starting of the k continuous time units is one of a CSI reference time unit or a slot after a CSI reference time unit, and wherein the CSI reference time unit is before the reporting slot.

20. The apparatus of claim 19, wherein a gap between the starting of the k continuous time units and the reporting slot including the first CSI is determined by signaling received by the wireless communication device.

* * * * *